Figure 1:
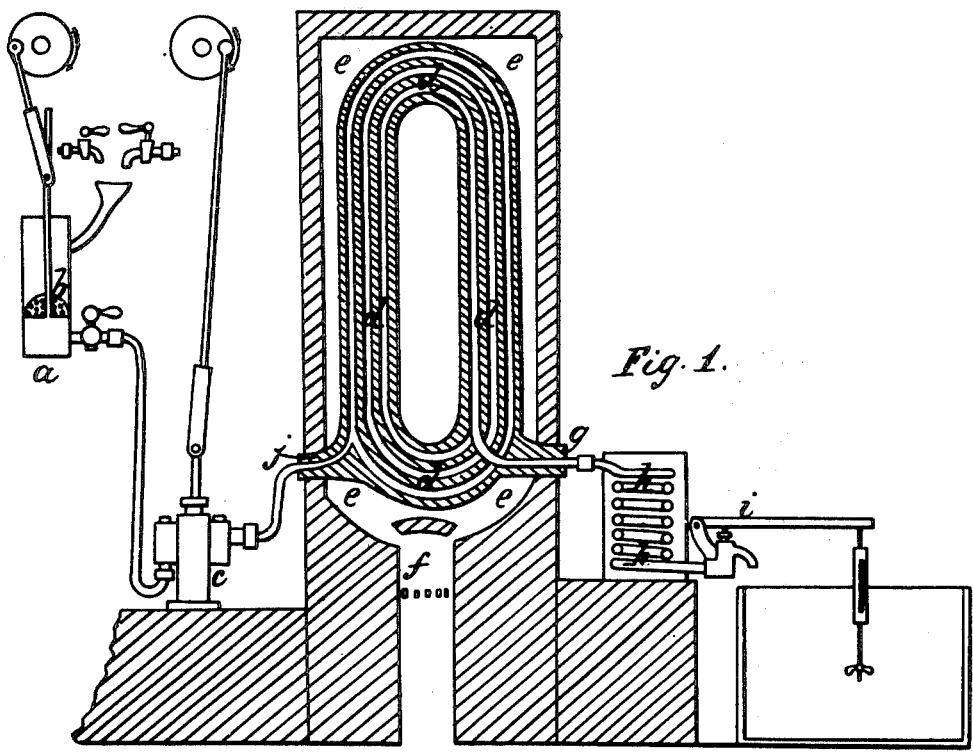

R. A. Tilghman,

Decomposing Fat.

No. 11,766.  Patented Oct. 3, 1854.

Inventor;
R. A. Tilghman
per B. C. Tilghman

UNITED STATES PATENT OFFICE.

RICHARD A. TILGHMAN, OF PHILADELPHIA, PENNSYLVANIA.

IMPROVEMENT IN PROCESSES FOR PURIFYING FATTY BODIES.

Specification forming part of Letters Patent No. 11,766, dated October 3, 1854.

*To all whom it may concern:*

Be it known that I, RICHARD ALBERT TILGHMAN, of Philadelphia, State of Pennsylvania, have invented a new and Improved Mode of Treating Fatty and Oily Bodies; and I hereby declare that the following is a full and exact description thereof.

My invention consists of a process for producing free fat acids and solution of glycerine from those fatty or oily bodies of animal and vegetable origin which contain glycerine as their base.

For this purpose I subject these fatty or oily bodies to the action of water at a high temperature and pressure, so as to cause the elements of those bodies to combine with water, and thereby obtain at the same time free fat acids and solution of glycerine.

I mix the fatty body to be operated upon with from a third to a half of its bulk of water and the mixture may be placed in any convenient vessel in which it can be heated to the melting-point of lead until the operation is complete. The vessel must be closed and of great strength, so that the requisite amount of pressure may be applied to prevent the conversion of the water into steam.

The process may be performed more rapidly and also continuously by causing the mixture of fatty matter and water to pass through a tube or continuous channel heated to the temperature already mentioned, the requisite pressure for preventing the conversion of the water into steam being applied during the process; and this, I believe, is the best mode of carrying my invention into effect.

In the drawings hereunto annexed are shown figures of an apparatus for performing this process speedily and continuously, but which apparatus I do not intend to claim as any part of my invention.

Figure 2:
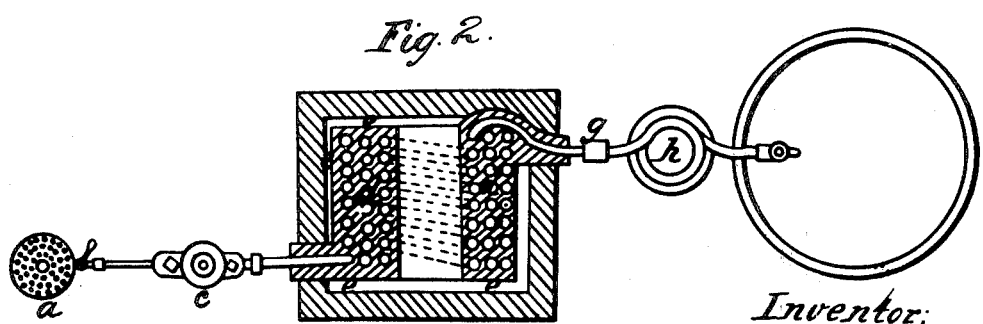

Figure 1 of the said drawings is a vertical section of this apparatus, and Fig. 2 shows the various parts of the apparatus in horizontal section.

Similar parts in these figures are marked with similar letters of reference.

I place the fat or oil, in a fluid state, in the vessel $a$, with from one-third to one-half its bulk of warm water. The disk or piston $b$, perforated with numerous small holes, being kept in rapid motion up and down in the vessel $a$, causes the fat or oil and water to form an emulsion or intimate mechanical mixture. A force pump, $c$, like those in common use for hydraulic presses, then drives the mixture through a long coil of very strong iron tube, $d\ d\ d\ d$, which, being placed in the furnace $e\ e$, is heated by a fire, $f$, to about the temperature of melting lead.

From the exit end $g$ of the heating tubes $d\ d$ the mixture, which has then become converted into free fat acids and solution of glycerine, passes on through another coiled iron tube, $h\ h\ h$, immersed in water, by which it is cooled down from its high temperature to below 212° Fahrenheit, after which it makes its escape through the exit valve $i$ into the receiving-vessel.

The iron tubes I have employed and found to be convenient for this purpose are about one inch external diameter and about half an inch internal diameter, being such as are in common use for Perkins' hot-water apparatus. The ends of the tubes are joined together by welding to make the requisite length; but when welding is not practicable I employ the kind of joints used for Perkins' hot-water apparatus, which are now well known. The heating tube $d\ d\ d$ is coiled several times backward and forward, so as to arrange a considerable length of tube in a moderate space. The different coils of the tube are kept about a quarter of an inch apart from each other, and the interval between them is filled up solid with cast iron, which also covers the outer coils or rows of tubes to the thickness of half or three quarters of an inch, as shown in Fig. 2. This casing of metal insures a considerable uniformity of temperature in the different parts of the coil, adding also to its strength and protecting it from injury by the fire.

The exit-valve $i$ is so loaded that when the heating-tubes $d\ d\ d$ are at the desired working temperature, and the pump $c$ is not in action, it will not be opened by the internal pressure produced by the application of heat to the mixture, and therefore when the pump $c$ is not in action nothing escapes from the valve $i$ if the temperature be not too high; but when the pump forces fresh mixture into one end, $j$, of the heating tubes $d\ d\ d$ the exit-valve $i$ is thereby forced open to allow an equal amount of the mixture which has been operated upon to escape out of the cooling-tubes $h\ h$ at the other end of the apparatus. No steam or air should be allowed to accumulate in the tubes, which should be kept entirely full of the mixture. For this purpose, whenever it may be required, the speed of the pump should be increased, so that the current through the tubes may be made sufficiently rapid to carry out with it any air remaining in them.

Although the decomposition of the neutral fats by water takes place with great quickness at the proper heat, yet I prefer that the pump $c$ should be worked at such a rate in proportion to the length or capacity of the heating-tubes $d\ d\ d$ that the mixture while flowing through them should be maintained at the desired temperature for ten minutes before it passes into the refrigerator or cooling parts $h\ h$ of the apparatus.

The melting point of lead has been mentioned as the proper heat to be used in this operation because it has been found to give good results; but the change of fatty matters into fat acid and glycerine takes place with some materials (such as palm-oil) at or below the melting point of bismuth, yet the heat has been carried considerably above the melting-point of lead without any apparent injury, and the decomposing action of the water becomes more powerful as the heat is increased. By starting the apparatus at a low heat and gradually increasing it the temperature giving products most suitable to the intended application of the fatty body employed can easily be determined.

To indicate the temperature of the tubes $d\ d\ d$, I have found the successive melting of metals and other substance of different and known degrees of fusibility to be convenient in practice. Several holes half an inch in diameter and two or three inches deep are bored into the solid parts of the casting surrounding the tubes, each hole being charged with a different substance. The series I have used consist of tin melting about 440° Fahrenheit, bismuth at about 510° Fahrenheit, lead at about 612° Fahrenheit, and nitrate of potash at about 660° Fahrenheit. A straight piece of iron wire passing through the side of the furnace to the bottom of each of the holes enables the workman to feel which of the substances are melted and to regulate the fire accordingly.

It is important for the quickness and perfection of the decomposition that the oil and water, during their entire passage through the heating-tubes, should remain in the same state of intimate mixture in which they enter them. I therefore prefer to place the series of heating-tubes in a vertical position, so that any partial separation which may take place while the liquids pass up one tube may be counteracted as they pass down the next. I believe that it will be found useful to fix at intervals in the heating-tubes diaphragms pierced with numerous small holes, so that the liquids, being forced through these obstructions with great velocity, may be thoroughly mixed together.

I deem it prudent to test the strength of the apparatus by a pressure of ten thousand pounds to the square inch before taking it into use; but I believe that the working-pressure necessary in using the heat I have mentioned will not be found to exceed two thousand pounds to the square inch. When it is desired to diminish the contact of the liquids with iron, the tubes or channels of the apparatus may be lined with copper.

The hot mixture of fat acids and solution of glycerine which escapes from the exit-valve of the apparatus separates by subsidence. The fat acids may then be washed with water and the solution of glycerine concentrated and purified by the usual means. The fat acids thus produced may, like those obtained by other methods, be used in the manufacture of candles and soap and applied to various purposes according to their quality, and when desired they may also be first bleached by chemical agents or purified by distillation in a current of steam, or in a vacuum, as is now well understood.

I prefer that the fatty bodies should be previously deprived as far as practicable of such impurities as would cause the discoloration of the fat acids produced; but when the fat acids are to be finally purified by distillation this preliminary purification is of less importance.

When sulphuric acid, nitrous fumes, or other corrosive agent shall have been used for purifying, hardening, or otherwise preparing the fatty body to be operated upon, I take care that all traces of it shall be washed out or neutralized before passing it through the apparatus. Some fatty bodies (particularly when impure) generate during the process a portion of acetic or other soluble acid, which might tend to injure the iron tubes. In such cases I add a corresponding quantity of alkaline or basic matter to the water and oil before they are pumped into the tubes.

Having now described the nature of my said invention and the manner of performing the same, I hereby declare that I claim as of my invention—

The manufacturing of fat acids and glycerine from fatty bodies by the action of water at a high temperature and pressure.

R. A. TILGHMAN.

Witnesses:
JAMES McCURLEY,
JOHN R. DARKER.